(12) United States Patent
Luan et al.

(10) Patent No.: US 9,760,432 B2
(45) Date of Patent: Sep. 12, 2017

(54) INTELLIGENT CODE APPARATUS, METHOD, AND COMPUTER PROGRAM FOR MEMORY

(71) Applicant: Futurewei Technologies, Inc., Plano, TX (US)

(72) Inventors: Hao Luan, Plano, TX (US); Alan Gatherer, Richardson, TX (US); Sriram Vishwanath, Austin, TX (US); Casen Hunger, Austin, TX (US); Hardik Jain, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 100 days.

(21) Appl. No.: 14/811,763

(22) Filed: Jul. 28, 2015

(65) Prior Publication Data
US 2017/0031762 A1 Feb. 2, 2017

(51) Int. Cl.
G06F 11/00 (2006.01)
G06F 11/10 (2006.01)
G06F 11/14 (2006.01)

(52) U.S. Cl.
CPC ...... *G06F 11/1012* (2013.01); *G06F 11/1088* (2013.01); *G06F 11/1448* (2013.01); *G06F 2201/84* (2013.01)

(58) Field of Classification Search
CPC .................. G06F 11/1012; G06F 11/1048
See application file for complete search history.

(56) References Cited

U.S. PATENT DOCUMENTS

| 5,586,296 | A | 12/1996 | Bernstein et al. | |
|---|---|---|---|---|
| 6,341,342 | B1 * | 1/2002 | Thompson | G06F 3/0613 707/999.202 |
| 7,945,752 | B1 * | 5/2011 | Miller | G06F 3/0611 711/114 |
| 8,074,021 | B1 * | 12/2011 | Miller | G06F 11/108 710/22 |
| 2003/0065884 | A1 | 4/2003 | Lu et al. | |
| 2007/0168700 | A1 | 7/2007 | Dickenson et al. | |
| 2007/0168702 | A1 | 7/2007 | Dickenson et al. | |
| 2009/0100236 | A1 | 4/2009 | Puig | |
| 2010/0023678 | A1 | 1/2010 | Nakanishi et al. | |
| 2011/0022791 | A1 | 1/2011 | Iyer et al. | |
| 2011/0167192 | A1 | 7/2011 | Iyer et al. | |
| 2012/0127818 | A1 | 5/2012 | Levy et al. | |

(Continued)

FOREIGN PATENT DOCUMENTS

CN 101132336 A 2/2008
CN 101196857 A 6/2008

(Continued)

OTHER PUBLICATIONS

U.S. Appl. No. 14/811,357, filed Jul. 28, 2015.
U.S. Appl. No. 14/810,895, filed Jul. 28, 2015.
U.S. Appl. No. 14/955,966, filed Dec. 1, 2015.

(Continued)

*Primary Examiner* — Joseph Kudirka
(74) *Attorney, Agent, or Firm* — Zilka-Kotab, PC (57) ABSTRACT

An intelligent code apparatus, method, and computer program are provided for use with memory. In operation, a subset of data stored in a first memory is identified. Such subset of the data stored in the first memory is processed, to generate a code. The code is then stored in a second memory, for use in reconstructing at least a portion of the data.

23 Claims, 9 Drawing Sheets

(56) References Cited

U.S. PATENT DOCUMENTS

| | | |
|---|---|---|
| 2012/0297118 A1 | 11/2012 | Gorobets et al. |
| 2013/0279280 A1 | 10/2013 | Franzon et al. |
| 2013/0339821 A1 | 12/2013 | Cordero et al. |
| 2014/0059301 A1 | 2/2014 | Rao |
| 2014/0173180 A1 | 6/2014 | D'Abreu et al. |
| 2016/0313923 A1* | 10/2016 | Lai .......................... G06F 3/065 |
| 2017/0031619 A1 | 2/2017 | Luan et al. |
| 2017/0153824 A1 | 6/2017 | Luan et al. |

FOREIGN PATENT DOCUMENTS

| | | |
|---|---|---|
| CN | 101436150 A | 5/2009 |
| CN | 101578614 A | 11/2009 |
| CN | 102460376 A | 5/2012 |
| CN | 103077123 A | 5/2013 |
| EP | 2717186 A1 | 4/2014 |
| EP | 2722764 A1 | 4/2014 |
| WO | 0029959 A1 | 5/2000 |
| WO | 2010151267 A1 | 12/2010 |

OTHER PUBLICATIONS

Non-Final Office Action from U.S Appl. No. 14/811,357, dated Sep. 22, 2016.
International Search Report and Written Opinion from International Application No. PCT/CN2015/098231, dated Aug. 24, 2016.
Romanski, H. "Cisco Announces Intent to Acquire Memoir Systems," Cisco Blogs, Sep. 18, 2014, pp. 1-2, retrieved from http://blogs.cisco.com/news/cisco-announces-intent-to-acquire-memoirsystems?_ga=1.212056084.1031501759.1477501413.
International Search Report from International Application No. PCT/CN2016/092030, dated Nov. 1, 2016.
International Search Report from International Application No. PCT/CN2016/092028, dated Oct. 31, 2016.
International Search Report from International Application No. PCT/CN2016/091925, dated Sep. 27, 2016.
Final Office Action from U.S. Appl. No. 14/811,357, dated Mar. 9, 2017.
Advisory Action from U.S. Appl. No. 14/811,357, dated May 17, 2017.

\* cited by examiner

INTELLIGENT CODE APPARATUS, METHOD, AND COMPUTER PROGRAM FOR MEMORY

FIELD OF THE INVENTION

The present invention relates to memory systems, and more particularly to coding for use in connection with memory systems.

BACKGROUND

Currently, a variety of techniques exist for generating and storing codes (e.g. parity codes, etc.) in memory systems. Typically, codes are generated for an entirety of data stored in memory. This results in a requirement for sizeable storage capacity to store all of such codes. This not only introduces added cost, but also results in reduced performance during operation.

SUMMARY

An intelligent code apparatus, method, and computer program are provided for use with memory. In operation, a subset of data stored in a first memory is identified. Such subset of the data stored in the first memory is processed, to generate a code. The code is then stored in a second memory, for use in reconstructing at least a portion of the data.

DETAILED DESCRIPTION

Figure 1:
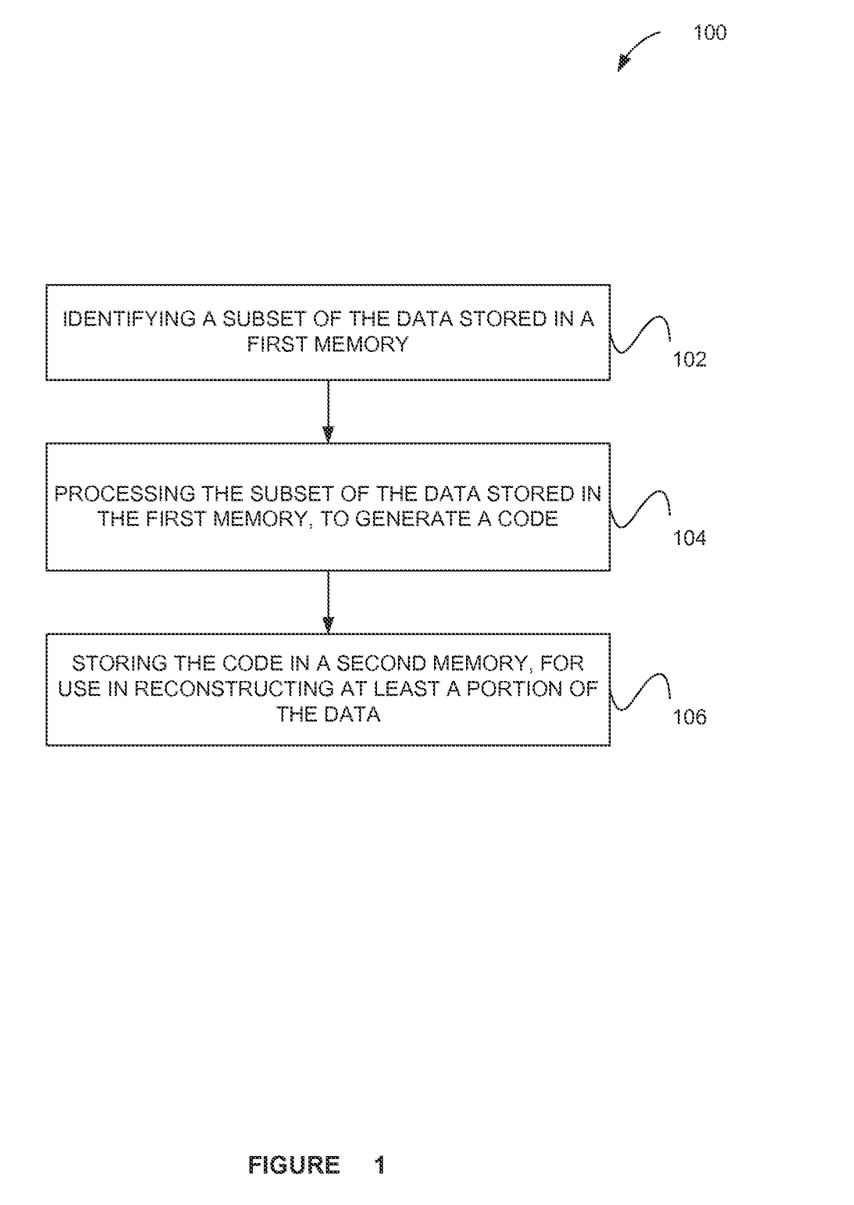
FIG. 1 illustrates a method for implementing an intelligent coded memory architecture, in accordance with one embodiment.

FIG. 1 illustrates a method 100 for implementing an intelligent coded memory architecture, in accordance with one embodiment. As shown in operation 102, a subset of data stored in a first memory is identified. In various embodiments, such first memory may include any type of memory. For example, in various embodiments, the first memory may take any form of random access memory (RAM), a cache, a bank, or any other type of memory, for that matter.

As will be set forth during the description of subsequent embodiments, the subset of data may, in various embodi-

2 ments, be identified based on one or more scheduled accesses in connection with such data subset. To this end, the subset of data may be identified as being the subject of an access in the first memory. Of course, in the context of other embodiments, the data subset may be identified using any desired algorithm (e.g. statistical, predictive, other, etc.) that results in only a subset of the data being identified for subsequent processing.

Next, the subset of the data stored in the first memory is processed, to generate a code. See operation 104. In the context of the present description, such code may include any code that is capable of being utilized for reconstructing data, as will soon become apparent. For example, in one embodiment, the code may include one or more bits that is generated based on the data subset. In another embodiment, the code may include a parity code. In use according to one possible embodiment, data that is not available due to a bank conflict in the first memory, may be reconstructed. Further, the aforementioned processing may be any processing that is capable of resulting in such a code.

The data subset that is identified may, in various embodiments, include data from two, three, or four banks, and the code may be generated based on any combination thereof. To put generally, in different embodiments, the second memory may include a number of components that is less than or equal to a number of components of the first memory. To this end, appropriate code complexity is thereby afforded. Of course, in the context of other embodiments, the data subset may not necessarily be limited in the foregoing manner, and may thus include any subset of data stored in the first memory.

With continued reference to FIG. 1, the code is stored in a second memory, for use in reconstructing at least a portion of the data. See operation 106. In the context of the present description, the second memory may or may not be a component (e.g. part, etc.) of the first memory. Further, similar to the first memory, the second memory may take any form of random access memory (RAM), a cache, a bank, or any other type of memory, for that matter.

As an option, in one embodiment, the code may be stored in the second memory with the subset of the data. Of course, other embodiments are contemplated where this is not the case. In any case, the code is subsequently available for reconstructing at least a portion (e.g. the subset or portion thereof, etc.) of the data, in connection with any subsequent access thereto. As an option, the code may be operable for performing one or more functions in connection with using one or more data items from every bank of the first memory. Further, by identifying only a relevant data subset for the purpose of generating the code, a variety of features may (or may not) be exhibited. For example, in various optional embodiments, the size of the second memory required for code storage may be conserved, simultaneous reads/writes may be enabled, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
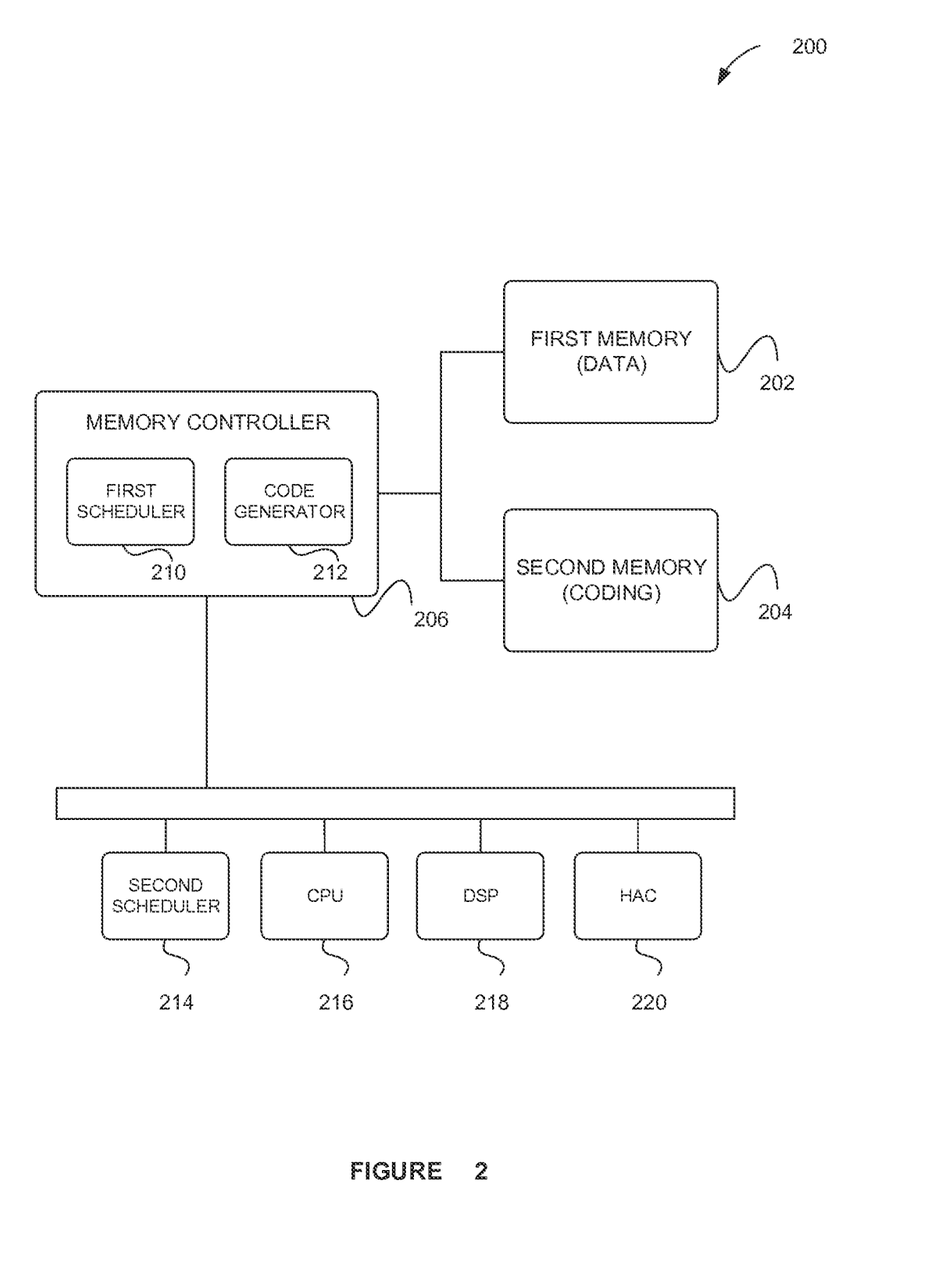
FIG. 2 illustrates an intelligent coded memory system, in accordance with one embodiment.

FIG. 2 illustrates an intelligent coded memory system 200, in accordance with one embodiment. As an option, the system 200 may be implemented in the context of any one or more of the embodiments set forth in any previous and/or subsequent figure(s) and/or description thereof. Of course, however, the system 200 may be implemented in the context of any desired environment.

As shown, included is a first memory 202 for storing original data, as well as second memory 204 for storing one or more codes. As mentioned earlier, such first memory 202 and second memory 204 may take any form. Further, while the first memory 202 and second memory 204 are shown in FIG. 2 to be separate memories, it should be noted that such first memory 202 and second memory 204 may be portions of the same unitary memory. Still yet, while shown to be proximate separate memories, other embodiments are contemplated where such first memory 202 and second memory 204 are remotely situated.

Further included is a memory controller 206 that is in communication with the first memory 202 and the second memory 204. As shown, the memory controller 206 is illustrated to include a variety of circuitry. For example, a first scheduler 210 is included for identifying a subset of the data stored in the first memory 202 for the purpose of generating a code therefor. The memory controller 206 further includes a code generator 212 for generating a code for the data subset identified through use of the first scheduler 210. While not shown, the code may be stored in the second memory 204 with the subset of the data.

With continuing reference to FIG. 2, a second scheduler 214 is in communication with the first scheduler 210. In various embodiments, the second scheduler 214 may include a global scheduler, a chip-level scheduler, or any other type of scheduler, for that matter. In use, the second scheduler 214 serves to schedule tasks (e.g. handled by a processor, etc.) in connection with various data, and further communicate with the memory controller 206 directly or via an interconnect such as a bus (as shown), for prompting the first scheduler 210 to be used to identify data subsets for code generation via the code generator 212.

It should be noted that, while the first scheduler 210 and the code generator 212 are shown to be components of the memory controller 206 in the instant embodiment, other embodiments are contemplated where such circuitry may be situated in a different device (e.g. integrated in a processor, memory, discrete chip(s), etc.), and/or positioned in separate different devices.

The same can be said of the second scheduler 214. While the second scheduler 214 is shown to be stand-alone with respect to a central processing unit (CPU) 216, a digital signal processor (DSP) 218, a hardware accelerator (HAC) 220; in other embodiments, it may be implemented in the context of a processor. For example, in various embodiments, such processor may include the CPU 216, the DSP 218, a specialized processor (e.g. the HAC 220, etc.), a processor core, or any other device (or component thereof) capable of processing data.

Further, while communication between some of the various components is shown to be a direct communication, it should be noted that other embodiments are contemplated where the communication is indirect (e.g. one or more other components sit there between, etc.). More information will now be set forth regarding an exemplary method by which the foregoing components may operate, in accordance with one embodiment.

Figure 3:
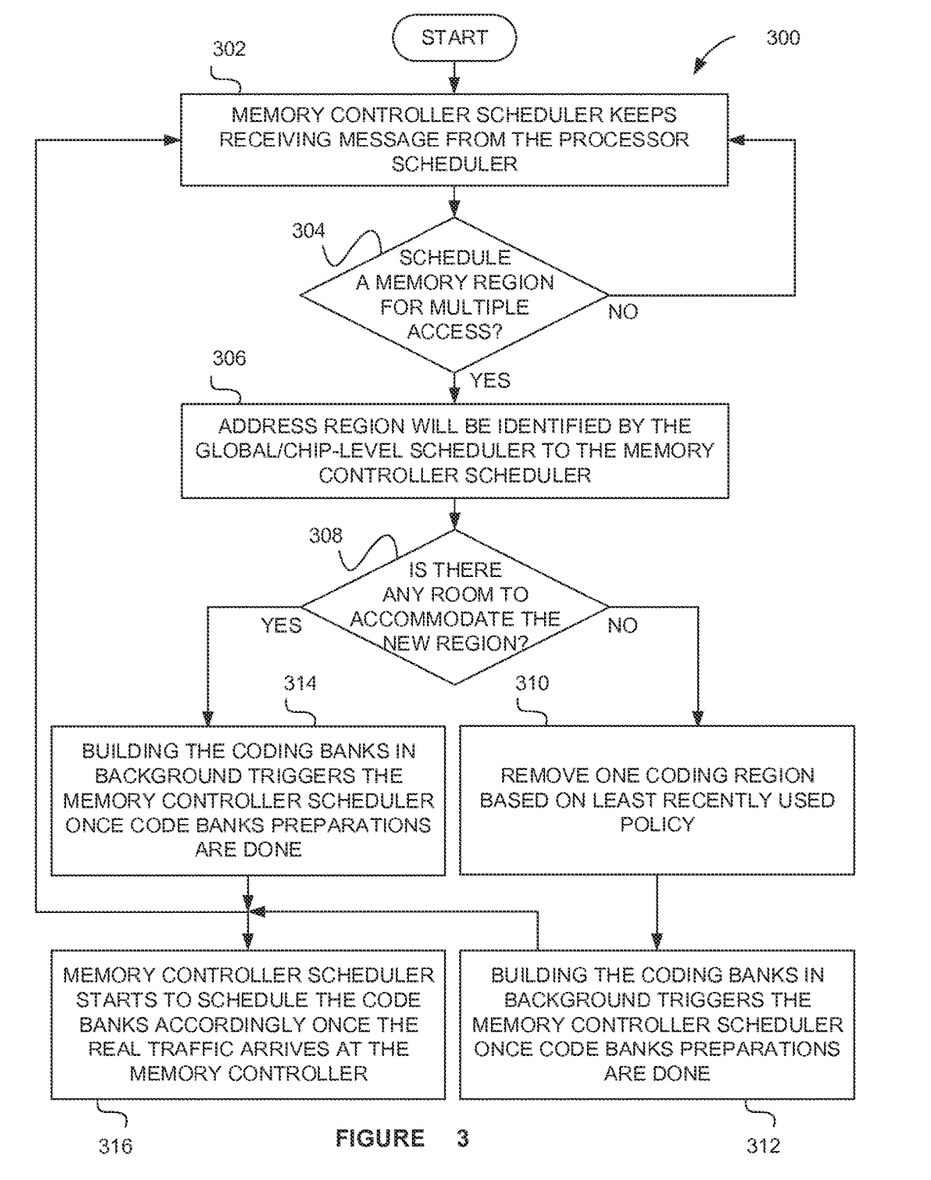
FIG. 3 illustrates method for implementing an intelligent coded memory system, in accordance with one embodiment.

FIG. 3 illustrates method 300 for implementing an intelligent coded memory system, in accordance with one embodiment. As an option, the method 300 may be implemented in the context of any one or more of the embodiments set forth in any previous and/or subsequent figure(s) and/or description thereof. For example, in one embodiment, the method 300 may be implemented in the context of the system 200 of FIG. 2. Of course, however, the method 300 may be implemented in the context of any desired environment.

In use, the data subset (that is the basis for the code) may be identified based on a request in connection with the subset of the data. Specifically, such request may include an access request that is identified by a global or chip-level scheduler (e.g. scheduler 214 of FIG. 2, etc.). In other embodiments, the data subset may be identified based on a plurality of requests in connection with the subset of the data, in real-time. For example, a plurality of access requests may be received to access different data. To this end, the data subset may be identified as including such different data, based on the access requests. Still yet, the process of identifying the data subset as including the different data may be carried out in real-time.

Still yet, information associated with the aforementioned request may be communicated by the global or chip-level scheduler to a memory controller scheduler (e.g. scheduler 210 of FIG. 2, etc.) of a memory controller (e.g. memory controller 206 of FIG. 2, etc.) via messages, so that such information may be used in identifying the appropriate data subsets for code generation. During use, the data subset may be processed (for code generation), at least in part, simultaneously with a processing of the access requests (for use in subsequent code generation).

With reference to FIG. 3, the memory controller scheduler receives the aforementioned messages from the global or chip-level scheduler. See operation 302. It is then determined whether data in a particular memory region of the first memory has been scheduled for multiple accesses. See decision 304. In one embodiment, such decision may be carried out by the global or chip-level scheduler.

If it is determined that data in a particular memory region has been scheduled for multiple accesses in decision 304, additional operations are triggered such that the subset of the data is conditionally processed (for code generation). Specifically, as shown in FIG. 3, such additional operations begin by an associated address region being communicated from the global or chip-level scheduler to the memory controller scheduler. See operation 306.

Next, in decision 308, the memory controller determines whether a capacity of the second memory is capable of accommodating the storage of the code. Specifically, it is determined whether there is any room to accommodate a new code region (e.g. coding bank, etc.) of codes. If not, an existing code region may be removed to create capacity. See operation 310. In one embodiment, the selection of the existing code region for removal may be based on a least-used policy, or any other algorithm, for that matter, that generates the necessary capacity. To this end, at least a portion of the second memory is cleared, based on the determination whether the capacity of the second memory is capable of accommodating the storage of the code.

In any case, the code banks may then be generated in the background, and the memory controller may be notified/triggered once code bank preparation is done. See operations 312-314. Next, in operation 316, the memory controller scheduler starts to schedule the coding banks accordingly, once the real traffic arrives at the memory controller. Thus, the storage of the code may be initiated, based on the determination whether the preparation of the second memory is ready for accommodating the storage of the code.

Still yet, in various embodiments, the subset of the data may be processed to generate the code, utilizing the same flow that was used to identify the data subset. Thus, in accordance with one possible embodiment, the identification of the data subset and the processing thereof for code generation may be initial and subsequent operations of the same flow, such that these operations are capable of being seamlessly performed "back-to-back" for real-time operation.

Once the coding banks are ready, the memory controller scheduler may also trigger some events to the global or chip-level scheduler. Further, in some situations, the global or chip-level scheduler may wait for the trigger to arrive, and then schedule tasks to processors, such as multiple CPU/DSP cores. Such multiple CPU/DSP cores may benefit from the coding banks, since they enable multiple simultaneous accesses to this region, to further improve overall performance.

More information will now be set forth regarding a plurality of different designs that may be implemented in the context of an intelligent coded memory system, in accordance with various embodiments. As will be set forth, each embodiment includes an efficient way of storing codes. For the purpose of describing and distinguishing such designs, the following terms in Table 1 are defined herein.

TABLE 1 data bank: The original bank which stores raw (e.g. original, etc.) data and which is present in a baseline (e.g. non-coded, etc.) system.
coding bank: The bank which stores at least one code.
code region: Group of bank(s), the division of which is done in order to ensure more efficient access and cater to availability of the code.
locality of code: The number of data bank elements used to form a code. For example, a coding bank which stores a + b has a locality of "2," since it uses a and b to form the coding.
availability of code: The number of times the data bank is present in the coding banks. For example, if codes (a + b), (a + c), (a + d) exist, the availability of (a) is 3 and the availability of (b), (c) and (d) is 1, since they appear only once in the coded system.
rate of code: This is a ratio of the number of data banks/total number of banks, i.e. N(Data bank)/[N(Data Bank) + N(Coding Bank)]. In one embodiment, this may only be the case if the coding bank size is same as the data bank size; otherwise, the formula of rate of code may be the Size of Original Data/Size of Coded Data, where Coded Data includes original data + coding data.

The following design embodiments are assumed to have the following constraints set forth in Table 2, merely for illustrative purposes.

Figure 4:
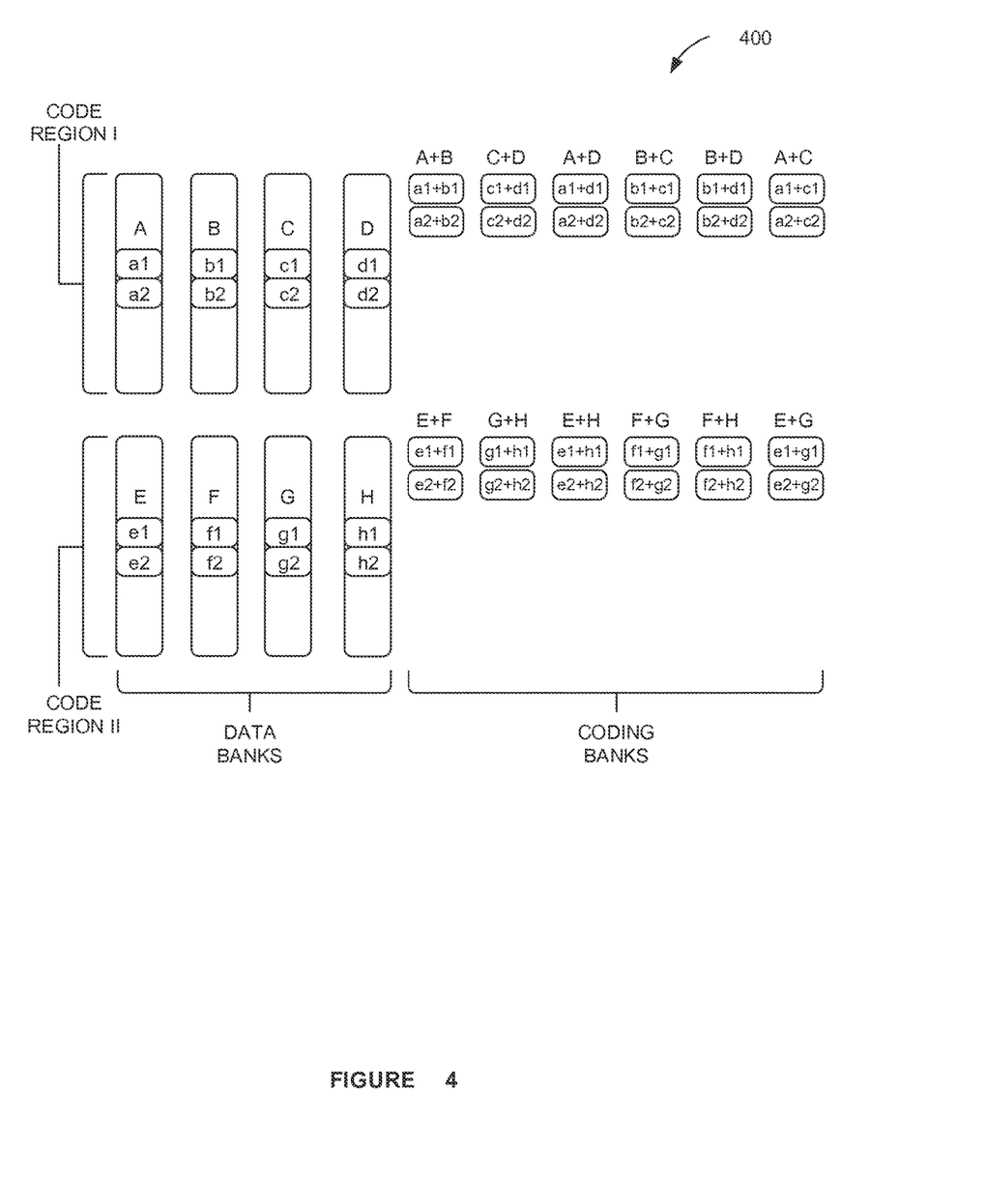
FIG. 4 illustrates a first design for implementing an intelligent coded memory system, in accordance with one embodiment.

TABLE 2 read access: 4 per bank in one cycle
write access: 2 per bank in one cycle
shared memory size: 8 kB-256 kB
number of banks: 8
memory overhead: 15%
coding banks: 5 or 6 shallow banks for code storage FIG. 4 illustrates a first design 400 for implementing an intelligent coded memory system, in accordance with one embodiment. As an option, the design 400 may be implemented in the context of any one or more of the embodiments set forth in any previous and/or subsequent figure(s) and/or description thereof. Of course, however, the design 400 may be implemented in the context of any desired environment.

The first design 400 uses the concept of batch codes to code specific rows of memory within each of the banks. This permits multiple accesses to be served to the coded region, using the coding banks. Under the first design 400, it may, in one possible embodiment, be guaranteed that any 4 read requests to the coded region can be served at any given time. As shown in FIG. 4, 8 banks are divided into two regions. Each region consists of 4 banks. Each region has 6 parallel shallow banks to store the code. The intermediate regions shown in the banks 1-8 are the coded region. These regions are assumed to be of a fraction of the memory.

In use, the code is designed to achieve maximum performance when sequential accesses to the coded regions are issued. During such access, up to 10 parallel accesses may be achieved in one cycle. For instance, a scenario may be considered if accesses are received to a1, b1, c1, d1, a2, b2, c2, d2, a3, b3, c3, and d3. Here, the first design 400 can serve a1, b1, c1, and d1, using a1 with the coding banks a1+b1, and b1+c1, c1+d1. Further, a2, b2, c2, and d2 can be served, using b2 from the associated data bank, and a2+d2, b2+d2, and a2+c2 from the coding banks. Lastly, the first design 400 can serve c3 and d3, using data bank C and data bank D.

In another scenario, the code scheme falls off to 4 access in a cycle when there are non-sequential and non-consecutive access to the memory banks. For example, this may occur when the access is requested for a1, b8, c9, and d15. Since a code for this combination is not present in the coding banks, the benefit of parallel access is unused. However, in this case, the first design 400 can use a prefetching mechanism to look ahead in the queue and pre-fetch codes from coding banks for the subsequent access. More information will be set forth hereinafter on such mechanism. FIG. 4 shows the storage pattern of the codes in the bank. Table 3 illustrates a summary of the first design 400.

TABLE 3

Fraction of coded region per bank = $\alpha$

Total overhead = $\frac{12 \times \alpha}{8} = 1.5\ \alpha$

Can serve maximum four read requests at one clock cycle to any bank

Figure 5:
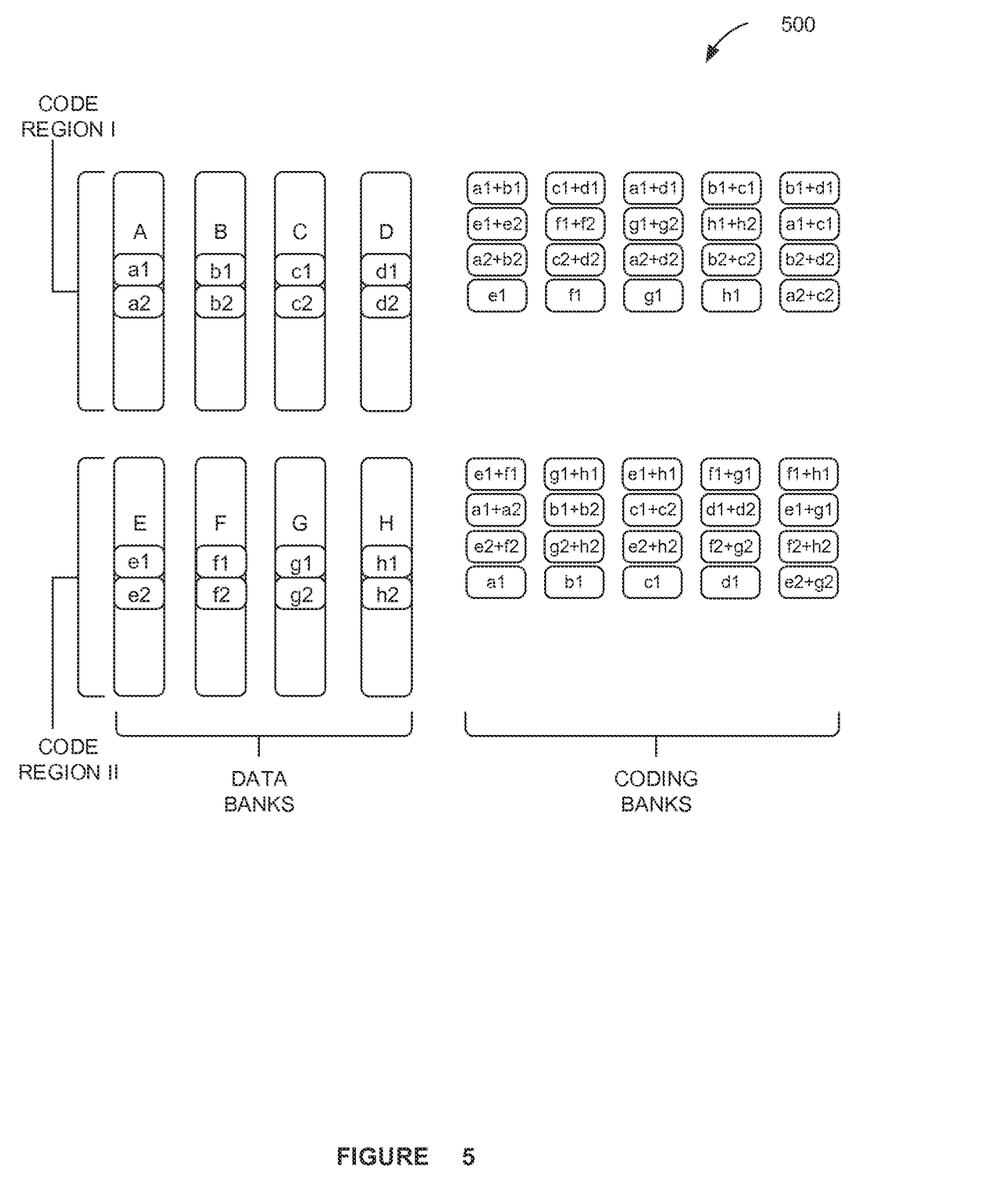
FIG. 5 illustrates a second design for implementing an intelligent coded memory system, in accordance with one embodiment.

FIG. 5 illustrates a second design 500 for implementing an intelligent coded memory system, in accordance with one embodiment. As an option, the design 500 may be implemented in the context of any one or more of the embodiments set forth in any previous and/or subsequent figure(s) and/or description thereof. Of course, however, the design 500 may be implemented in the context of any desired environment.

As shown, the design 500 improves over the design 400 of FIG. 4 by allowing maximum 5 read accesses per bank, per cycle. The design 500 also divides banks into two regions. The first region is bank A to bank D, with 5 corresponding coding banks. The two regions shown in FIG. 5 include an upper 9 banks forming one region and a lower 9 banks forming another region. The design 500 allows an intermix storage of codes among regions. The design 500 further uses 5 coding banks per region. The data under this design 500 is coded for both inter-bank and intra-bank codes. The intra-bank codes are stored in the alternate coding bank region. This allows usage of coding banks from the other region if they are available.

Under normal usage, the design 500 allows achievement of maximum performance when sequential accesses to the coded regions are issued. During such access, up to 9 parallel accesses can be achieved in one cycle. For example, a scenario may be considered where accesses are received to a1, b1, c1, d1, a2, b2, c2, d2, a3, b3, and c3. Here, a1, b1, c1, d1 can be served, using a1 with the coding banks a1+b1, b1+c1, and c1+d1. Further, a2, b2, d2 can be served, using b2 with the coding banks a2+d2 and b2+d2. Lastly, c2 and d3 can be served using bank 3 and bank 4.

In one embodiment, these may be non-sequential and non-consecutive accesses to the memory banks. For example, when the access pattern is d1, d6, d9, d15, and d20; the design 500 can perform these 5 reads with the help of the coded banks. It may read d1 from bottom coding banks in code region II where it has stored d1, d6 from the original data bank in code region I; read a9 and a9+d9 to get d9; read b15 and b15+d15 to get d15; and read c20 and c20+d20 to get d20 all from Code Region I and its associated coding banks. The design 500 can further use prefetching mechanisms to look ahead in the queue and pre-fetch codes from coding banks for further accesses. For example, prefetching program code may analyze all outstanding read and write commands from all queues, to generate optimized access patterns so that maximum data and coding banks accesses may be performed in parallel. To this end, the number of reads and writes may be increased.

Table 4 illustrates a summary of the design 500.

TABLE 4

Fraction of coded region per bank = α

$$\text{Total overhead} = \frac{10 \times 2\alpha}{8} = 2.5\ \alpha$$

Can serve maximum five read requests at one clock cycle to a bank

Figure 6:
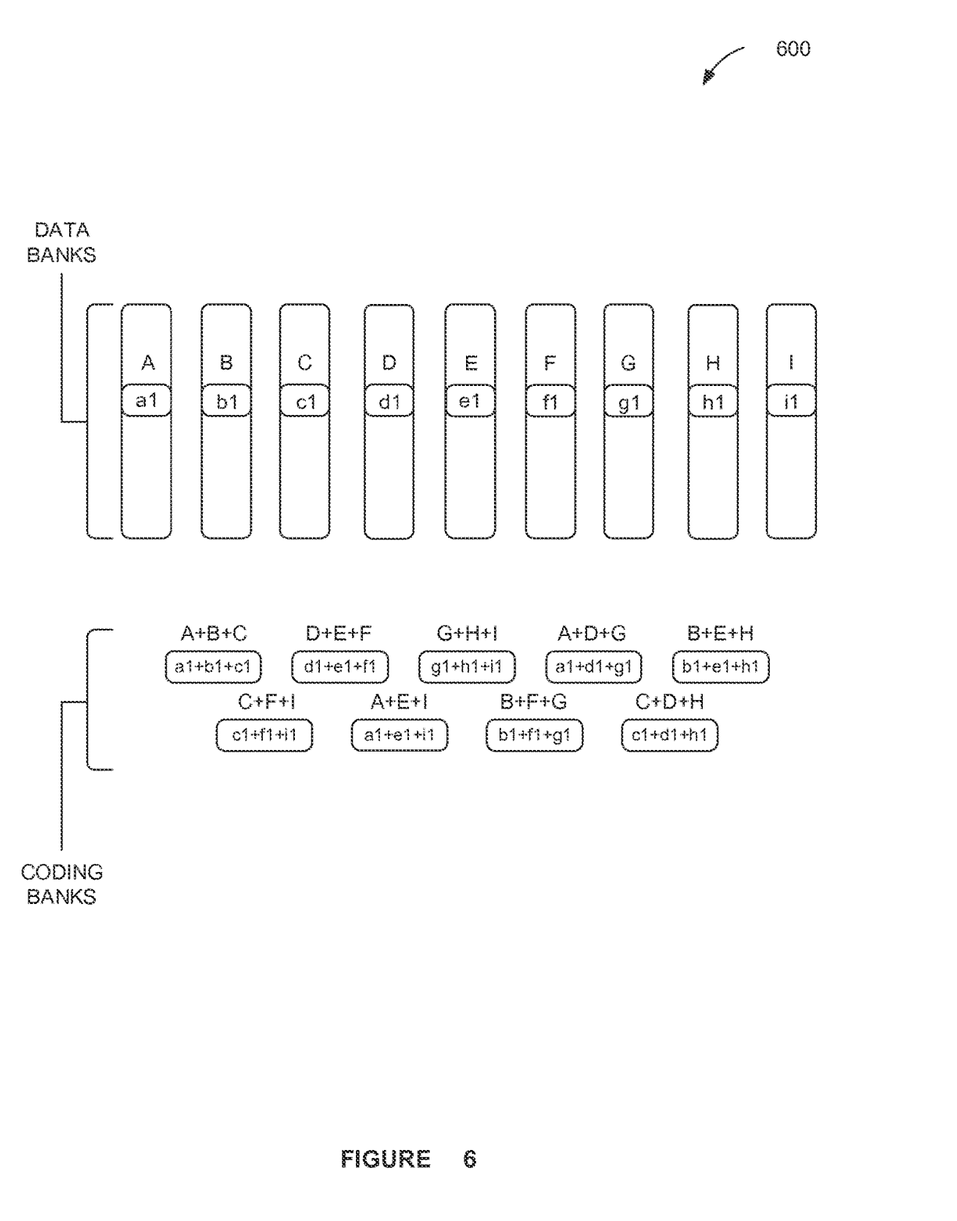
FIG. 6 illustrates a third design for implementing an intelligent coded memory system, in accordance with one embodiment.

FIG. 6 illustrates a third design 600 for implementing an intelligent coded memory system, in accordance with one embodiment. As an option, the design 600 may be implemented in the context of any one or more of the embodiments set forth in any previous and/or subsequent figure(s) and/or description thereof. Of course, however, the design 600 may be implemented in the context of any desired environment.

The designs 400/500 of FIGS. 4/5 achieve a rate of 2/5. The design 600 achieves a rate of 1/2. The design 600 requires 9 data banks and 9 coding banks as shown in FIG. 6. The design 600 also has a comparatively higher locality of 3. That is, the design 600 requires the memory controller to "know" two out of three data elements to decode the third. This also helps achieve 4 simultaneous read access per bank per cycle and 2 simultaneous write access per bank per cycle. The memory overhead for the design 600 is less (just α) compared to the designs 400/500. However, the design 600 possesses higher logical complexity because of increased locality. Example cases for this design are described below in Table 5.

TABLE 5

4 reads for Bank A such as a0, a1, a2 and a3:
  1 read from bank A for a0
  1 read to bank B, C and A + B + C to get b1,
  c1 and a1 + b1 + c1 to resolve a1
  1 read to bank D, G and A + D + G to get d2,
  g2, and a2 + d2 + g2 to resolve a2
  1 read to bank E, I and A + E + I to get e3, i3
  and a3 + e3 + i3 to resolve a3
3 reads to bank A such as a0, a1, and a3; and 1 read to bank B such as b0:

TABLE 5-continued

1 read from bank A for a0
  1 read to bank D, G, and A + D + G to get d1,
  g1 and a1 + d1 + g1 to resolve a1
  1 read to bank E, I and A + E + I to get e2, i2,
  a2 + e2 + i2 to resolve a2
  1 read to bank B to get b0
2 reads to bank A such as a0, a1; and 2 reads to bank B such as b0 and b1:
  1 read from bank A for a0
  1 read to bank D, G and A + D + G to get d1,
  g1, and a1 + d1 + g1 to resolve a1
  1 read from bank B for b0
  1 read to bank E, H and B + E + H to get e1,
  h1, and e1 + e1 + h1 to resolve b1
2 reads to bank A such as a0 and a1, 1 read to bank B as b0, and 1 read for bank C as c0:
  1 read from bank A for a0
  1 read to bank D, G and A + D + G to get
  d1, g1, and a1 + d1 + g1 to resolve a1
  1 read from bank B for b0
  1 read from bank C for c0

Table 6 illustrates a summary of the design 600.

TABLE 6

Fraction of coded region per bank = α

$$\text{Total overhead} = \frac{9 \times \alpha}{9} = \alpha$$

Can serve maximum four read requests at one clock cycle to a bank

Table 7 compares the design embodiments of FIGS. 4-6 for various parameters and associated costs.

TABLE 7

| Design | Max Read per bank | Max Write per bank | Locality | Rate | Memory Overhead | Logical Complexity |
|---|---|---|---|---|---|---|
| design 400 of FIG. 4 | 4 | 2 | 2 | 2/5 | 1.5 α | Low |
| design 500 of FIG. 5 | 5 | 2 | 2 | 2/5 | 2.5 α | Medium |
| design 600 of FIG. 6 | 4 | 2 | 3 | 1/2 | α | Medium |

Figure 7:
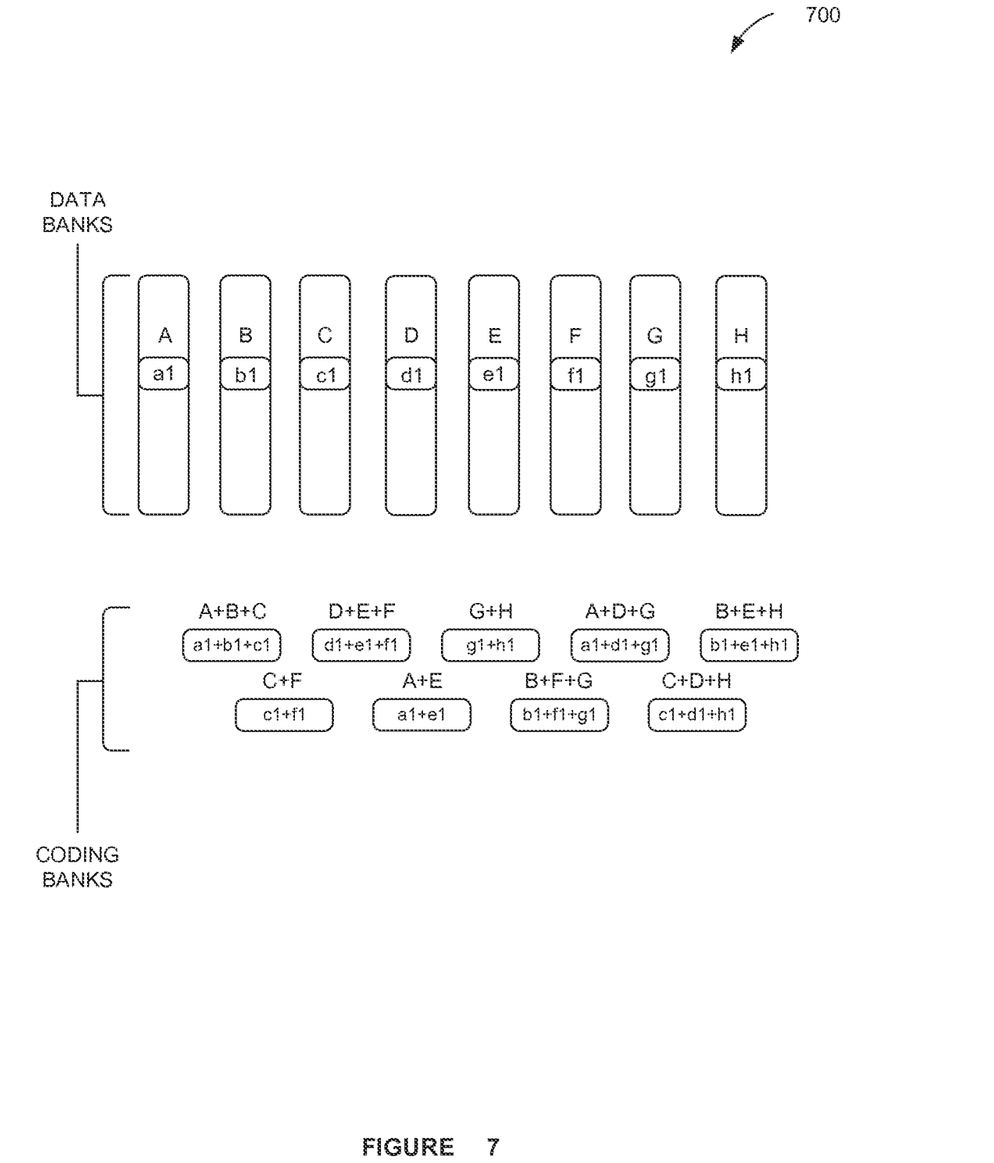
FIG. 7 illustrates a design with a modification over the design of FIG. 6, in accordance with one embodiment.

FIG. 7 illustrates a design 700 with a modification over the design 600 of FIG. 6, in accordance with one embodiment. Table 8 illustrates a summary of the design 700.

TABLE 8

Fraction of coded region per bank = α

$$\text{Total overhead} = \frac{9 \times \alpha}{8} = 1.125\ \alpha$$

Can serve maximum four read requests at one clock cycle to a bank

In summary, in various embodiments, a coded memory system may be implemented to create data redundancy in a compressed form. In one embodiment, the coded data may be an arithmetic combination of the original data. The codes may also be obtained by using a disjointed combination of data. A code can also contain a subset of these disjointed combinations to support read and write guarantees. In one embodiment, code construction may be divided into two sets. For example, in the context of inter-bank coding, the codes may be constructed by taking data values from m banks. That is, if there are two banks, Bank A and Bank B, the code may be constructed by adding the data value from these two banks. This coding may be helpful in spreading the access across banks. On the other hand, in the context of intra-bank coding, the codes may be constructed by using the data values from the same bank. For instance, in an example where Bank A has values from a1 to $a_n$, the codes may be constructed as a1+a2, a2+a3, and so on. Here, the bank is self-coded, and the code banks exist for each data bank. It should be noted that, in this case, the codes can be constructed in a pattern or random nature, to afford a best rate. For example, when coded sequentially (a1+a2, a2+a3, and so on), read access requests may have to be sequential to use the codes, which is generally the case. In the previous sentence, the "+" sign may refer to an Exclusive-OR operation between the two terms involved; however, in general, it represents a functional operation which involves both a1 and a2 [e.g. Func(a1,a2), etc.]. In some embodiments, random codes may be supported also in the case of address space layout randomization (ASLR) systems.

Figure 8:
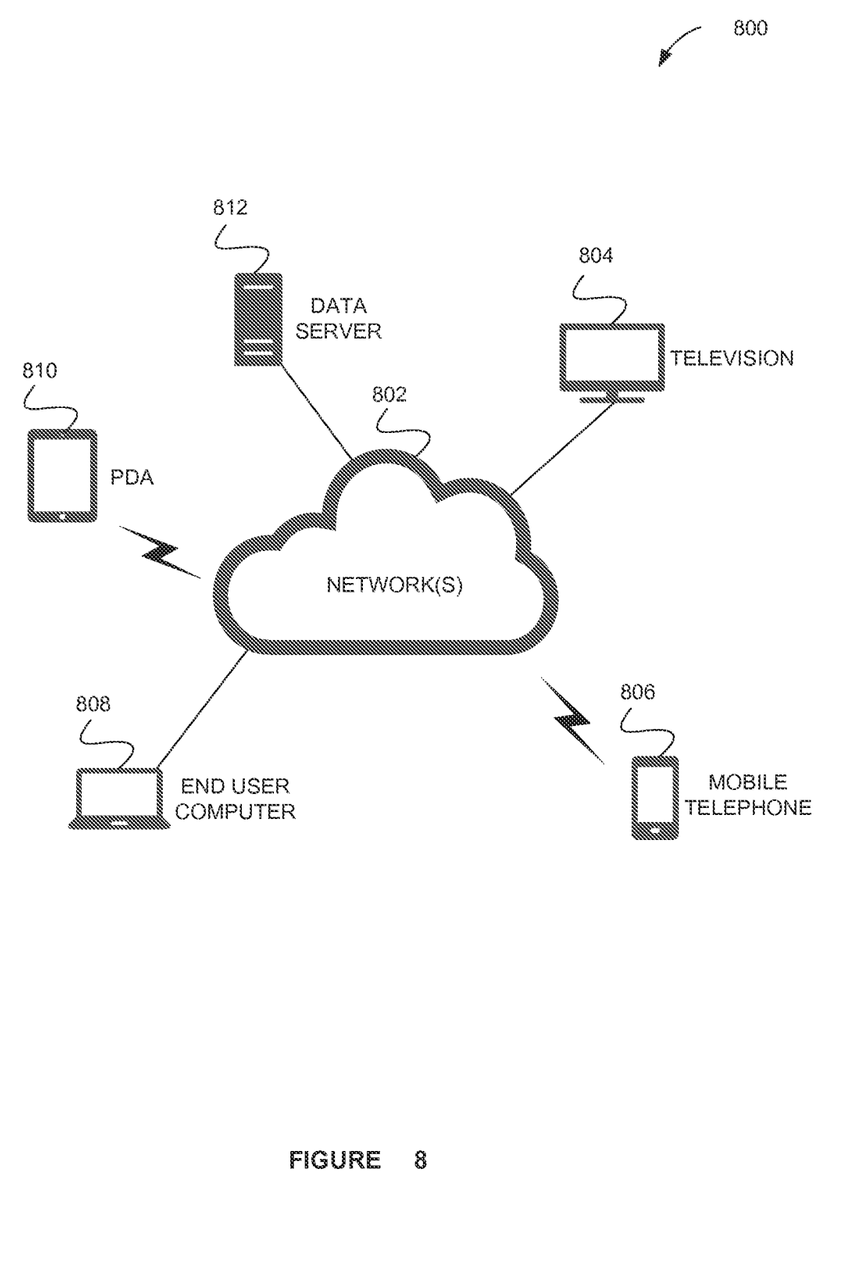
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 812 and an end user computer 808 may be coupled to the network 802 for communication purposes. Such end user computer 808 may include a desktop computer, lap-top computer, and/or any other type of logic. Still yet, various other devices may be coupled to the network 802 including a personal digital assistant (PDA) device 810, a mobile phone device 806, a television 804, etc.

Figure 9:
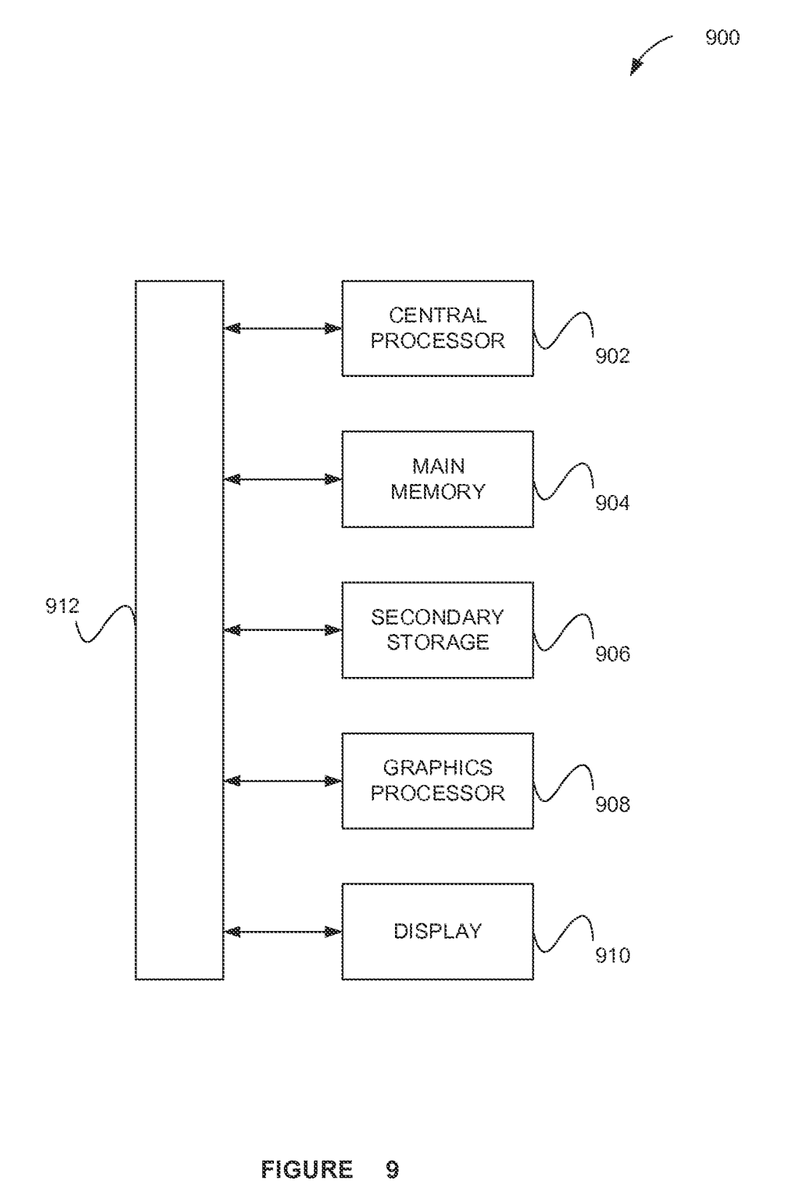
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication interconnect 912, such as a bus. The system 900 also includes main memory 904 [e.g. random access memory (RAM), etc.]. The system 900 also includes a graphics processor 908 and a display 910.

The system 900 may also include a secondary storage 906. The secondary storage 906 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 904, the secondary storage 906, and/or any other memory, for that matter. Such computer programs, when executed, enable the system 900 to perform various functions (as set forth above, for example). Memory 904, storage 906 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
a first memory for storing data;
a second memory; and
circuitry in communication with the first memory and second memory, the circuitry configured for:
statistically identifying a subset of the data stored in the first memory, the subset of the data being identified by selecting a pattern of the data that limits a memory overhead to a predetermined value;
processing the subset of the data stored in the first memory, to generate a code, and
storing the code in the second memory, for use in reconstructing at least a portion of the data;
wherein the circuitry is further configured such that the subset of the data is identified based on a request in connection with the subset of the data, and the subset of the data is processed, at least in part, simultaneously with a processing of the request that is the basis for the identification of the data.

2. The apparatus of claim 1, wherein the circuitry is configured such that data that is not available due to a bank conflict in the first memory, is reconstructed.

3. The apparatus of claim 1, wherein the second memory is at least one of: separate from the first memory, or a component of the first memory.

4. The apparatus of claim 1, wherein the circuitry is a component of a memory controller.

5. The apparatus of claim 1, wherein the circuitry is further configured such that the code is stored in the second memory with the subset of the data.

6. The apparatus of claim 1, wherein the circuitry is further configured such that the subset of the data is identified based on a plurality of requests in connection with the subset of the data in real-time.

7. The apparatus of claim 1, wherein the circuitry is further configured such that, the subset of the data is identified by utilizing a flow, and the subset of the data is processed to generate the code by a memory controller, utilizing the flow.

8. The apparatus of claim 1, wherein the circuitry is further configured such that the request is identified by a scheduler outside of a memory controller.

9. The apparatus of claim 1, wherein the circuitry is further configured for receiving a message including information associated with a request in connection with the subset of the data, and the subset of the data is identified based on the information.

10. The apparatus of claim 1, wherein the circuitry is further configured for determining whether the first memory is scheduled for a plurality of accesses.

11. The apparatus of claim 10, wherein the circuitry is further configured such that the subset of the data is conditionally processed based on whether the first memory is scheduled for a plurality of accesses.

12. The apparatus of claim 1, wherein the circuitry is further configured for determining whether a capacity of the second memory is capable of accommodating the storage of the code.

13. The apparatus of claim 12, wherein the circuitry is further configured such that at least a portion of the second memory is cleared, based on the determination whether the capacity of the second memory is capable of accommodating the storage of the code.

14. The apparatus of claim 13, wherein the circuitry is further configured such that the at least portion of the second memory is cleared based on a least-used policy.

15. The apparatus of claim 1, wherein the circuitry is further configured for determining whether a preparation of the second memory is ready for accommodating the storage of the code.

16. The apparatus of claim 15, wherein the circuitry is further configured such that the storage of the code is initiated, based on the determination whether the preparation of the second memory is ready for accommodating the storage of the code.

17. The apparatus of claim 1, wherein the circuitry is further configured such that the subset of the data includes first data of a first bank of the first memory and second data of a second bank of the first memory, such that the code is operable for performing one or more functions in connection with the first data of the first bank and the second data of the second bank.

18. The apparatus of claim 1, wherein the circuitry is further configured such that the subset of the data includes first data of a first bank of the first memory, second data of a second bank of the first memory, and third data of a third bank of the first memory; such that the code is operable for performing one or more functions in connection with the first data of the first bank, the second data of the second bank, and the third data of the third bank.

19. The apparatus of claim 1, wherein the apparatus is configured such that the code is operable for performing one or more functions in connection with using one or more data items from every bank of the first memory.

20. The apparatus of claim 1, wherein the apparatus is operable for reconstructing a plurality of simultaneous read operations in connection with a bank.

21. The apparatus of claim 1, wherein the memory overhead is limited to fifteen percent.

22. A method, comprising:
statistically identifying a subset of data stored in a first memory, the subset of the data being identified by selecting a pattern of the data that limits a memory overhead to a predetermined value;
processing the subset of the data stored in the first memory, to generate a code; and
storing the code in a second memory, for use in reconstructing at least a portion of the data;
wherein the subset of the data is identified based on a request in connection with the subset of the data, and the subset of the data is processed, at least in part, simultaneously with a processing of the request that is the basis for the identification of the data.

23. A computer program product embodied on a non-transitory computer readable medium, comprising:
code for statistically identifying a subset of data stored in a first memory, the subset of the data being identified by selecting a pattern of the data that limits a memory overhead to a predetermined value;
code for processing the subset of the data stored in the first memory, to generate a code; and
code for storing the code in a second memory, for use in reconstructing at least a portion of the data;
wherein the subset of the data is identified based on a request in connection with the subset of the data, and the subset of the data is processed, at least in part, simultaneously with a processing of the request that is the basis for the identification of the data.

* * * * *